United States Patent [19]
Yonezawa

[11] Patent Number: 6,024,354
[45] Date of Patent: Feb. 15, 2000

[54] CLAMPING APPARATUS

[75] Inventor: Keitaro Yonezawa, Kobe, Japan

[73] Assignee: Kabushiki Kaisha Kosmek, Hyogo, Japan

[21] Appl. No.: 09/182,674

[22] Filed: Oct. 30, 1998

[30] Foreign Application Priority Data

Oct. 31, 1997 [JP] Japan .................................. 9-299762

[51] Int. Cl.⁷ .................................................. B23Q 3/10
[52] U.S. Cl. ............................................................ 269/309
[58] Field of Search .................................... 269/309, 310, 269/48.1, 234; 198/345; 228/49.3

[56] References Cited

U.S. PATENT DOCUMENTS 4,909,493  3/1990  Yonezawa .
4,948,105  8/1990  Yonezawa .
5,096,347  3/1992  Kumagai et al. .
5,174,554  12/1992  Yonezawa .
5,810,344  9/1998  Nishimoto .

Primary Examiner—Robert C. Watson
Attorney, Agent, or Firm—Bacon & Thomas PLLC

[57] ABSTRACT

A housing (11) includes an annular driving member (16), into which a cylindrical pull rod (12) is inserted. An actuation member (26) is inserted into the pull rod (12). At the time of clamping, the pull rod (12) has an upper end portion fitted into a stepped hole (2) of a workpiece (1) and the driving member (16) is lowered. Then, first the pull rod (12) descends relatively to the actuation member (26) to project a plurality of engaging balls (13) outwards and subsequently these balls (13) are brought into butting contact with a lower step portion (8) of the stepped hole (2). Thus the driving member (16) pulls the workpiece (1) downward through the pull rod (12) and the balls (13).

12 Claims, 15 Drawing Sheets

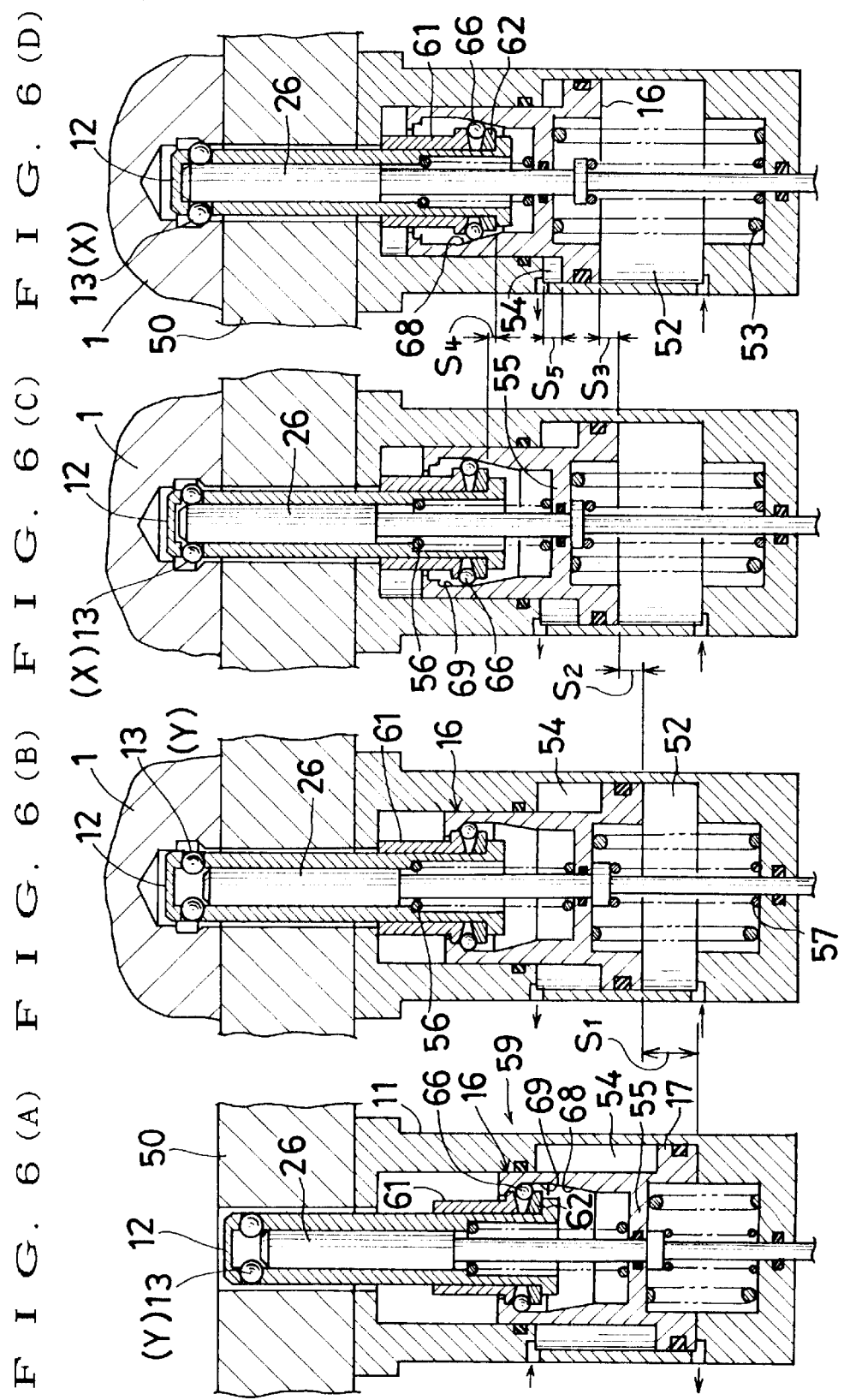

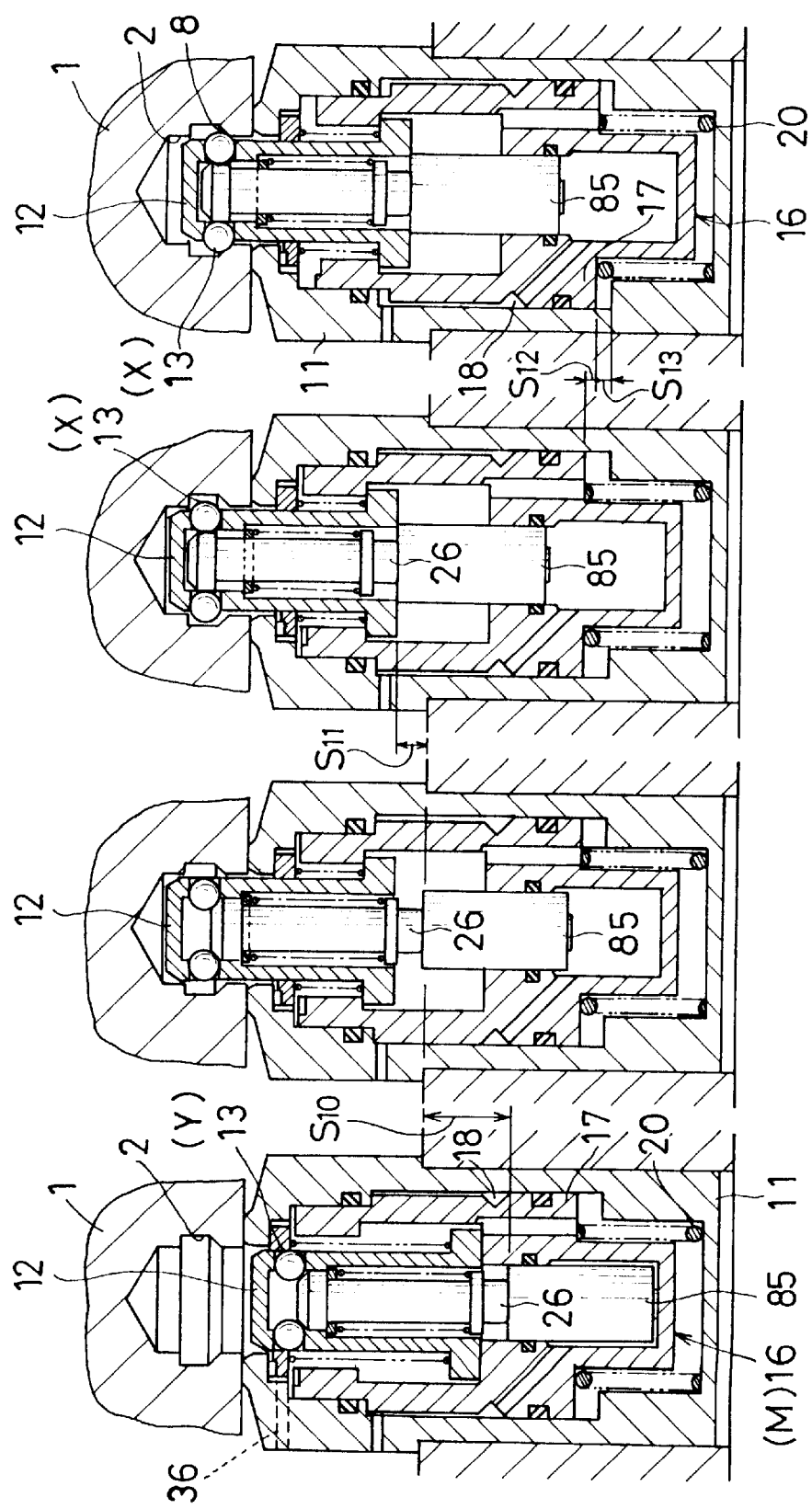

F I G . 1 2
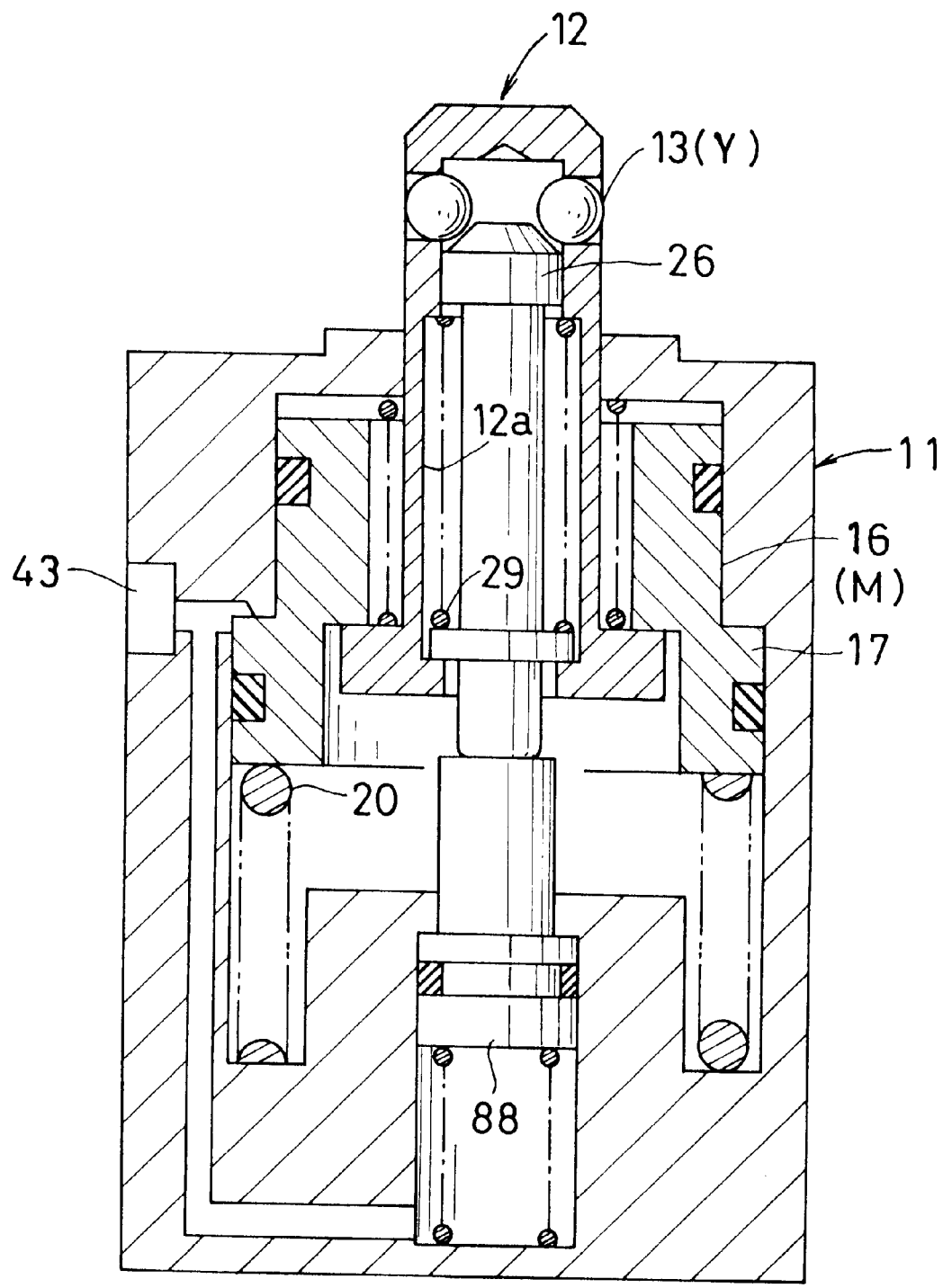

F I G. 1 4
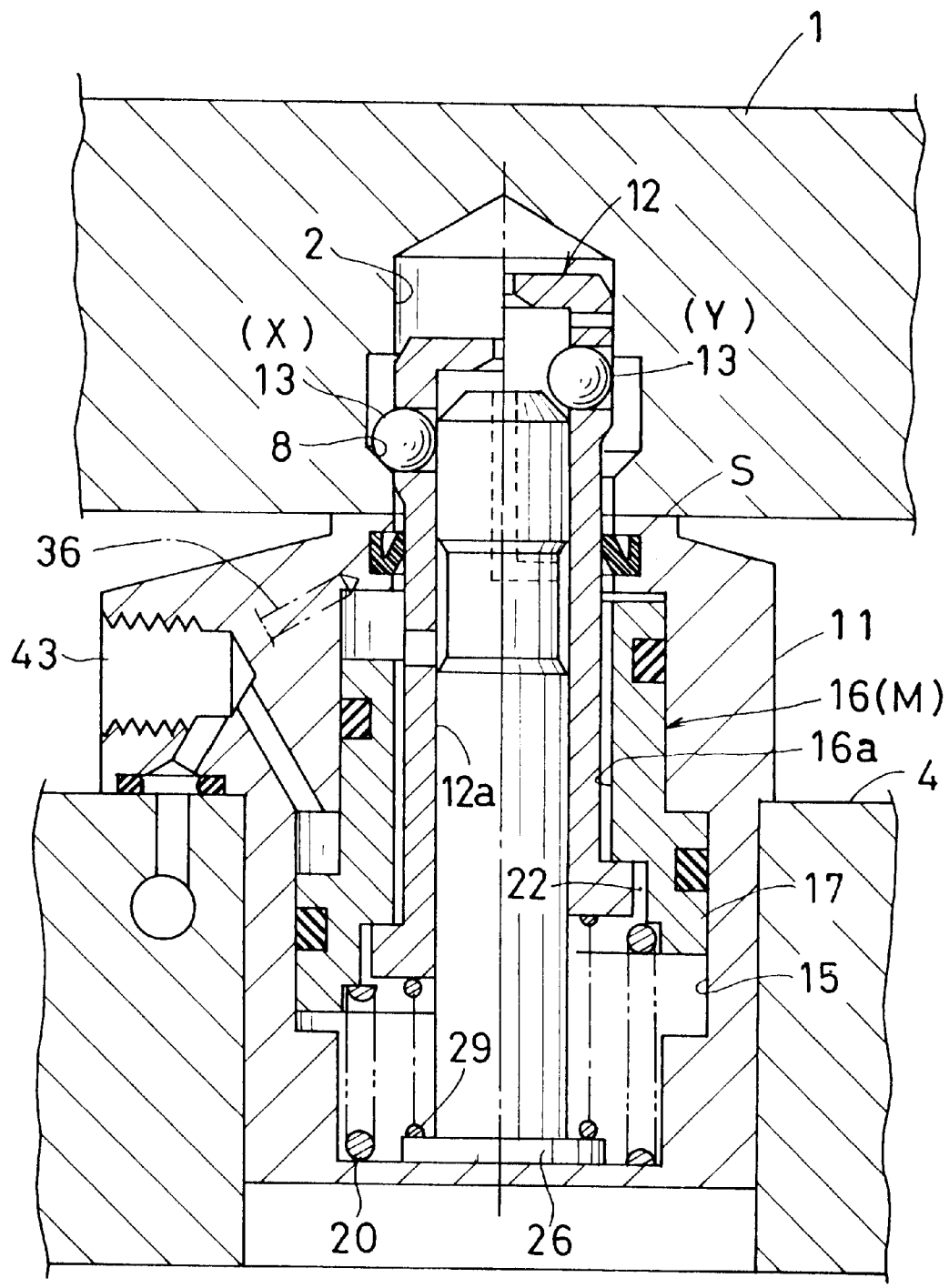

CLAMPING APPARATUS

BACKGROUND OF THE INVENTION

1. Technical Field

The present invention relates to a clamping apparatus of such a type that pulls a workpiece, a metal mold or the like object to be fixed, to a work pallet, a table or the like support pedestal and fixes it thereto.

2. Description of the Earlier Technology

A common clamping apparatus is adapted to arrange a clamping member around an object to be fixed which has been placed on a support pedestal and make the clamping member push the object to the support pedestal.

The conventional clamping apparatus arranged the clamping member around the object to be fixed. Accordingly, there was a disadvantage that the clamping member reduced a working space around the object to be fixed.

SUMMARY OF THE INVENTION

The present invention aims at proposing a clamping apparatus for improving the foregoing disadvantage.

In order to achieve the aim, the present invention has constructed a clamping apparatus in the following manner, for example, as shown in FIGS. 1 to 4, FIGS. 5 to 8 or FIGS. 9 to 15, respectively.

A housing 11 has a cylindrical pull rod 12 axially movably inserted thereinto. The pull rod 12 has a leading end (a first end portion) adapted so as to be able to fit into a stepped hole 2 of an object 1 to be fixed. The leading end of the pull rod 12 has a plurality of engaging members 13 peripherally spaced apart at a predetermined distance. The engaging members 13 are supported by the pull rod 12 so as to be movable between a radially outward projected position (X) and a radially inward retreated position (Y). The pull rod 12 has a cylindrical hole 12a into which an actuation member 26 is inserted. The actuation member 26 and the pull rod 12 are moved axially and relatively to each other, thereby changing over the engaging members 13 from the retreated position (Y) to the projected position (X). At the time of clamp driving, a clamping mechanism (M) moves the pull rod 12 toward a base end (a second end portion).

The present invention functions in the following manner, for example, as shown in FIGS. 1 and 2.

In an unclamping condition of FIG. 1, the pull rod 12 is raised relatively to the actuation member 26 and the engaging members 13 are changed over to the retreated position (Y).

At the time of clamping, first the stepped hole 2 of the object 1 is fitted onto the pull rod 12 and thereafter the pull rod 12 is lowered by the clamping mechanism (M) (here a piston 17 of a driving member 16).

Then, first the pull rod 12 descends relatively to the actuation member 26 to project the engaging members 13 outwardly in a radial direction. Next, as shown in FIG. 2, the engaging members 13 at the projected position (X) is brought into butting contact with a lower step portion 8 of the hole 2. Thus the clamping mechanism (M) pulls the object 1 downwards through the pull rod 12 and the engaging members 13 to fix its surface (R) to be fixed to a support surface (S).

The clamping condition of FIG. 2 is switched over to the unclamping condition of FIG. 1 through the procedures substantially opposite to the above-mentioned ones.

Accordingly, the present invention produces the following effects.

In the clamping condition, the object 1 to be fixed can have five of its six surfaces except the surface (R) opened. Therefore, in the case where the object to be fixed is a workpiece, while it is being clamped as mentioned above, the five surfaces can be continuously machined. This can surprisingly improve the efficiency of machining. Further, in the case where the object to be fixed is a metal mold, a space around the metal mold is not reduced to result in enhancing the workability when exchanging the metal mold.

The object to be fixed can fulfil the intended purpose only if it is provided with a stepped hole. It need not project an attachment for clamping. Consequently, the object to be fixed is easily handled.

Further, the actuation member is inserted into the pull rod, which enables the pull rod to secure a sufficient pulling strength and at the same time can make the clamping apparatus compact.

Besides, the relative movement between the pull rod and the actuation member can change over the position of the engaging members. This simplifies the structure for changing over to result in a possibility of making the clamping apparatus more compact.

In addition, the leading end of the pull rod supports the engaging members. This can prevent the engaging members from falling down and therefore effect the clamping and the unclamping reliably.

BRIEF DESCRIPTION OF THE DRAWINGS

FIG. 1 to FIG. 4 show a first embodiment of the present invention;

FIG. 1 is a vertical sectional view of a clamping apparatus unclamped;

FIG. 2 is a vertical sectional view of the clamping apparatus clamped;

FIG. 3 is a vertical sectional view of the clamping apparatus having a pull rod retracted;

FIG. 5 and FIG. 6(A) to FIG. 6(D) show a second embodiment of the present invention;

FIG. 5 is a vertical sectional view of a clamping apparatus for a metal mold while it is operating;

FIG. 6(A) to FIG. 6(D) explain how the clamping apparatus for the metal mold operates;

FIG. 7(A) is an end view when seen along a line 7A—7A in a direction indicated by arrows in FIG. 7(B);

FIG. 7(B) explains its operation. Its right half view shows a wedging member released from being pushed and its left half view illustrates the wedging member pushed;

FIG. 8(A) is an end view when seen along a line 8A—8A in a direction indicated by arrows in FIG. 8(B);

FIG. 8(B) explains its operation and corresponds to he left half view in FIG. 7(B);

FIG. 9(A) to FIG. 9(D) show a third embodiment of the present invention and explain how it operates;

FIG. 12 shows a sixth embodiment of the present invention and corresponds to FIG. 10;

FIG. 14 explains how an eighth embodiment of the present invention operates. Its right half view corresponds to FIG. 1 and its left half view corresponds to FIG. 2.

DESCRIPTION OF THE PREFERRED EMBODIMENTS

Figure 1:
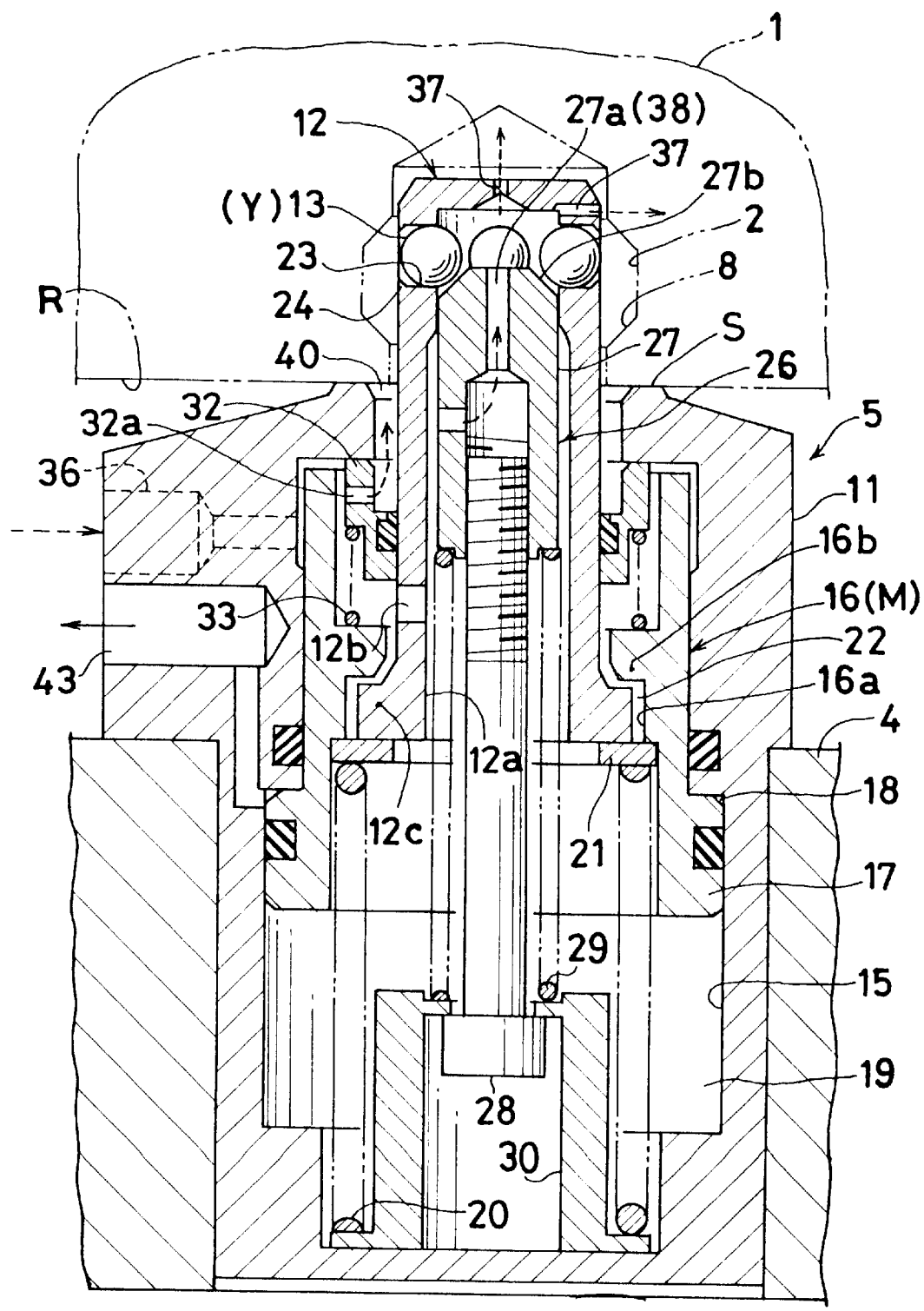
Figure 3:
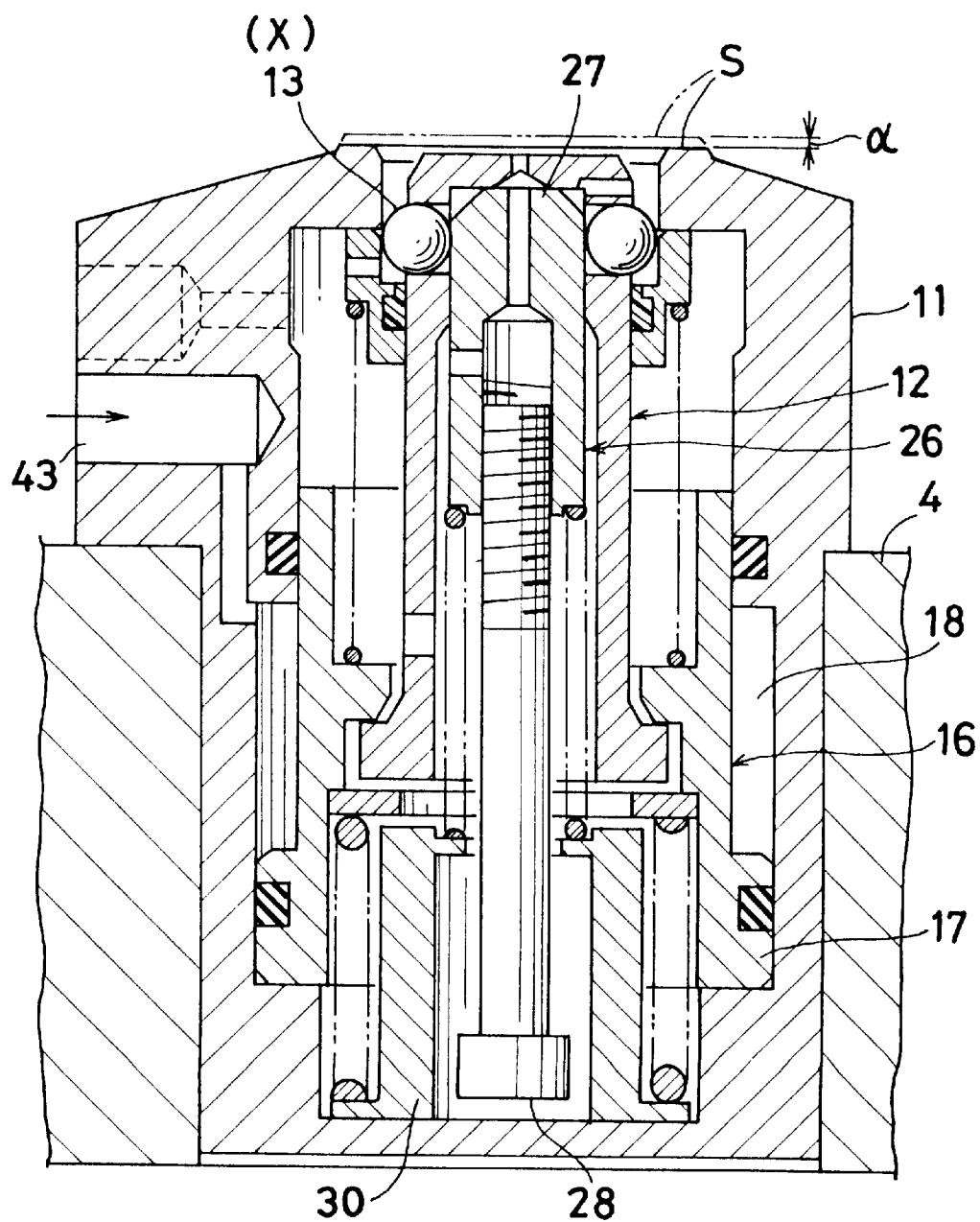
Figure 4A:
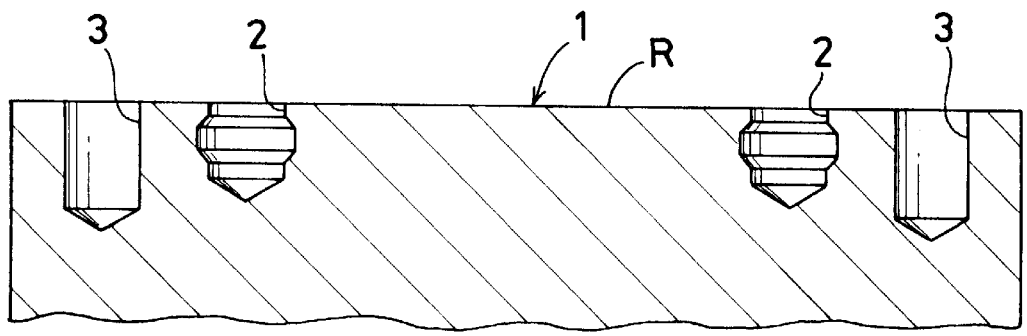
FIG. 4(A) is an elevational view of a workpiece to be fixed by the clamping apparatus.
Figure 4B:
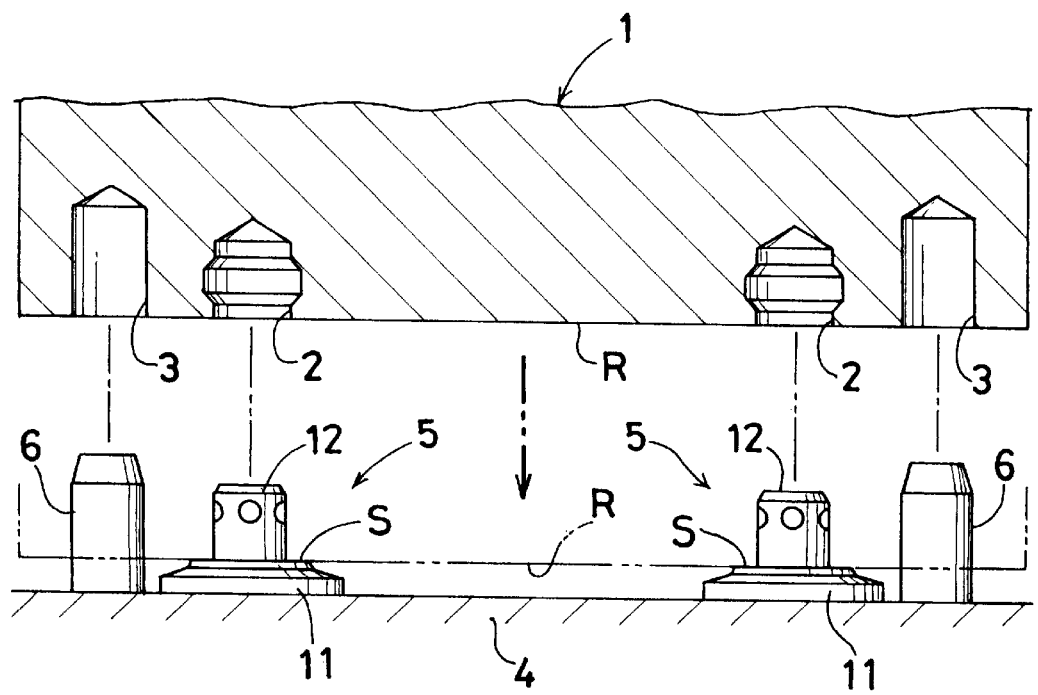
FIG. 4(B) is an elevational view showing the workpiece ready to be placed on housings of the clamping apparatuses.

A first embodiment of the present invention is explained with reference to FIGS. 1 to 4. First, FIGS. 1, 2 and 4 explain how an object to be fixed is clamped by a clamping apparatus. FIGS. 1 shows an unclamping condition and FIG. 2 does a clamping condition. FIGS. 4(A) and 4(B) are schematic views explaining how the clamping apparatuses operate.

In FIG. 4(A), numeral 1 indicates a workpiece (object to be fixed) ready to be machined by a machining center. The workpiece 1 has six surfaces of a front, a rear, an upper, a lower, a right and a left ones. The upper surface is preliminarily provided with a reference surface (surface to be fixed) (R) by machining. Next, the reference surface (R) is formed with a plurality of stepped holes 2 and a plurality of guide holes 3 (here only two of each of the holes are shown).

In FIG. 4(B), numeral 4 designates a work pallet for supporting the workpiece 1. The work pallet 4 has a plurality of clamping apparatuses 5 and a plurality of guide pins 6 (only two of each of them are shown) fixed thereto. A housing 11 of every clamping apparatus 5 has an upper surface which forms a support surface (S) receiving the workpiece 1.

When fixing the workpiece 1 to the pallet 4, as shown in FIG. 4(B), first the workpiece 1 in a posture of FIG. 4(A) is vertically reversed and the vertically reversed workpiece 1 is lowered. Then, first the guide holes 3,3 are fitting onto the guide pins 6,6 and thereafter the stepped holes 2,2 are fitting onto pull rods 12,12 of the clamping apparatuses 5. Thus the reference surface (R) of the workpiece 1 is received by the support surfaces (S),(S) as shown by a two-dot chain line in FIG. 4(B) as well as in FIG. 1.

Next, each of the clamping apparatuses 5 is clamp driven by a clamping mechanism (M) to be mentioned later. Then, as shown in FIG. 2, a plurality of engaging balls (engaging members) 13 supported by a leading end of the pull rod 12 engage with a lower step portion 8 of the stepped hole 2 to pull the lower step 8 downward through the pull rod 12 and the engaging balls 13, thereby fixing the workpiece 1 to the support surfaces (S),(S).

Subsequently, the pallet 4 is conveyed into a machining center and then the machining center continuously machines five of the six surfaces except the reference surface (R) of the workpiece 1.

When the machining is completed, first the work pallet 4 is conveyed out of the machining center and then is rid of the workpiece 1 by cancelling the clamping condition.

Figure 2:
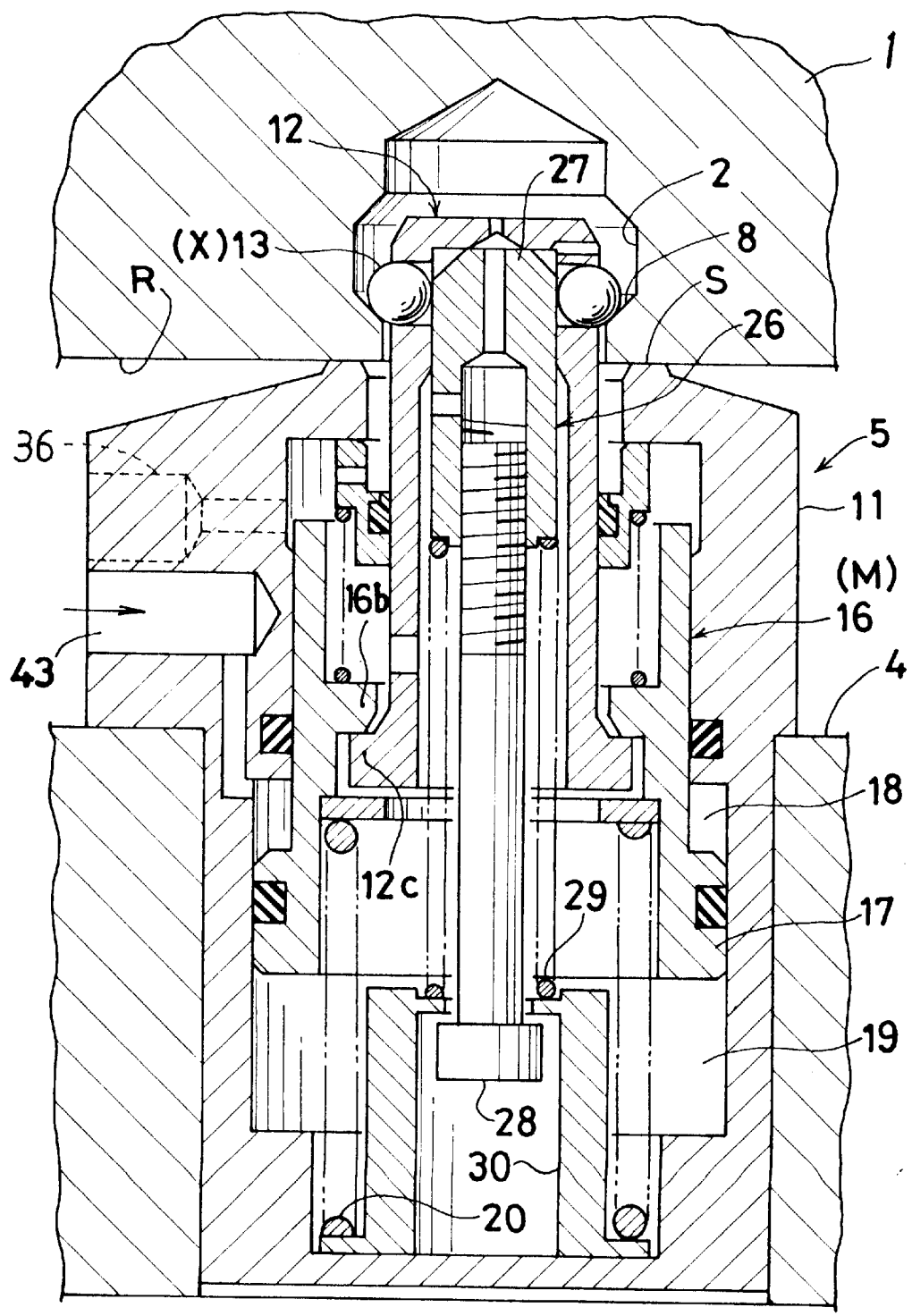

Next, a detailed structure of the clamping apparatus 5 is explained by relying on FIGS. 1 and 2.

The housing 11 has a guide bore 15, into which an annular driving member 16 is vertically movably inserted. The driving member 16 has a piston 17 provided with an actuation chamber 18 on its upper side and with a spring chamber 19 on its lower side. The driving member 16 and the actuation chamber 18 compose the clamping mechanism (M). Numerals 20 and 21 indicate a return spring and a spring retaining ring, respectively.

The driving member 16 has a cylindrical hole 16a, into which the pull rod 12 is vertically movably inserted with an annular gap 22 interposed therebetween. The pull rod 12 has at its lower portion an input portion 12c, which is placed on the spring retaining ring 21. The pull rod 12 has a cylindrical wall which supports by its upper portion the engaging balls 13 as peripherally spaced apart at a predetermined distance. Each ball 13 is supported in a support aperture 23 of the pull rod 12 so as to be movable between a radially outward projected position (X) and a radially inward retreated position (Y). In other words, each ball 13 is adapted to be changeable over from the projected position (X) far away from an axis of the pull rod 12 to the retreated position (Y) close to the axis and vice versa. And the support aperture 23 has an external end provided with a diametrically reduced portion 24, which prevents the ball 13 from escaping.

The pull rod 12 has a cylindrical hole 12a, into which an actuation member 26 is vertically movably inserted. The actuation member 26 comprises a projecting rod 27 and a height adjusting bolt 28 and is pushed up by an advancing spring 29. Numeral 30 indicates a spring retaining sleeve.

The annular gap 22 has an upper portion to which a dust sealing sleeve 32 is radially movably attached. Numeral 33 indicates a holding spring.

The clamping apparatus 5 operates as follows.

In FIG. 4(B), when starting the workpiece 1 depicted by a full line to descend, the clamping apparatus 5 is switched over to the unclamping condition of FIG. 1.

More specifically, by discharging pressurized oil through a supply and discharge port 43, the return spring 20 advances the driving member 16 and the pull rod 12 to their upper limit positions and at the same time the advancing spring 29 advances the actuation member 26 to its upper limit position. The balls 13 are changed over to the retreated position (Y).

In the unclamping condition of FIG. 1, cleaning compressed air is supplied to a cleaning fluid supply port 36 of the housing 11. Then the compressed air passes through the annular gap 22, a through hole 12b of the pull rod 12 and a flow passage 27a within the projecting rod 27 in order, to be discharged from a plurality of blowout holes 37 (here only two of them are shown) formed at an upper end of the pull rod 12. In other words, the annular gap 22, the through hole 12b and the flow passage 27a composes a communication passage 38.

By lowering the workpiece 1, the compressed air discharged from the blowout holes 37 blows away dust, chip or the like foreign matters adhered to the stepped hole 2 of the workpiece 1 to clean it. This can prevent the pull rod 12 from mis-fitting into the stepped bore 2.

When the workpiece 1 descends, if an axis of the stepped hole 2 misaligns with that of the pull rod 12, the existence of the annular gap 22 makes the pull rod 12 and the dust sealing sleeve 32 horizontally move to automatically correct the misalignment of the axes.

Thus the stepped hole 2 smoothly fits onto the pull rod 12 and at the same time the reference surface (R) of the workpiece 1 is received by the support surface (S) of the housing 11.

Just before the reference surface (R) is received by the support surface (S), a clearance between the surfaces (R) and (S) is narrowed. The compressed air discharged from another blowout hole 40 flows through the narrowed clearance so vigorously that both of the surfaces (R) and (S) can be strongly cleaned. Accordingly, the workpiece 1 can be precisely positioned with respect to the housing 11.

More specifically, the another blowout hole 40 is formed between an outer peripheral surface of the pull rod 12 and an upper end portion of the housing 11. The supply port 36 is communicated with the another blowout hole 40 through the annular gap 22 and a through hole 32a of the sleeve 32.

Next, the pressurized oil is supplied to the supply and discharge port 43 to lower the pull rod 12 by an oil pressure force acting on the piston 17. Then, first the balls 13 are pushed by a cam face 27b of the projecting rod 27 to be changed over to the projected position (X). Subsequently, as shown in FIG. 2, the balls 13 are brought into butting contact with the lower step portion 8 of the stepped hole 2. Thus a driving force of the piston 17 is transmitted to the workpiece 1 through an output portion 16b of the driving member 16, the input portion 12c of the pull rod 12 and the balls 13 to thereby fix the workpiece 1 to the pallet 4.

In the clamping condition, the cleaning compressed air is inhibited from leaking out to increase a pressure at the supply port 36. This pressure increase is detected by a pressure switch (not shown) to make it possible to judge whether or not the clamping apparatus 5 is in the clamping condition.

When cancelling the clamping condition of FIG. 2, it is sufficient if the pressurized oil is discharged from the actuation chamber 18. Then the driving member 16 and the pull rod 12 are going up by the return spring 20 and also the actuation member 26 is going up by the advancing spring 29.

As shown in FIG. 1, the pull rod 12 further goes up with respect to the actuation member 26 inhibited from rising by the spring retaining sleeve 30, thereby rendering the balls 13 free (here the balls are shown to have been already changed over to the retreated position (Y)). Thereafter, when the workpiece 1 is moved upward, the stepped hole 2 retracts the balls 13 to the retreated position (Y) to result in smoothly extracting the workpiece 1.

After a plurality of clamping apparatuses 5 have been installed on the work pallet 4, each housing 11 has its support surface (S) cut to the same level prior to using it. More specifically, as shown in FIG. 3, the support surface (S) of every housing 11 is provided with a working allowance (α) of a predetermined dimension. When cutting the allowance (α), the pressurized oil is supplied to the supply and discharge port 43. Then the driving member 16 descends to lower the pull rod 12 into the housing 11 and the height adjusting bolt 28 into the spring retaining sleeve 30, thereby positioning a leading end surface of the pull rod 12 inwards of the support surface (S) with the working allowance (α) removed. Thus it is possible to easily cut the working allowance (α).

In the first embodiment, a working fluid for clamp driving may be other kinds of liquid or gas such as compressed air instead of the pressurized oil.

The communication passage 38 for the cleaning fluid may be formed in the cylindrical hole 12a of the pull rod 12 in the shape of a groove instead of or in addition to forming it within the actuation member 26.

FIGS. 5 to 8 show another embodiment while FIGS. 9 to 15 illustrate other different embodiments, respectively. These other embodiments will be explained by, in principle, putting the same characters to the members having the same functions as those of the first embodiment.

Figure 5:
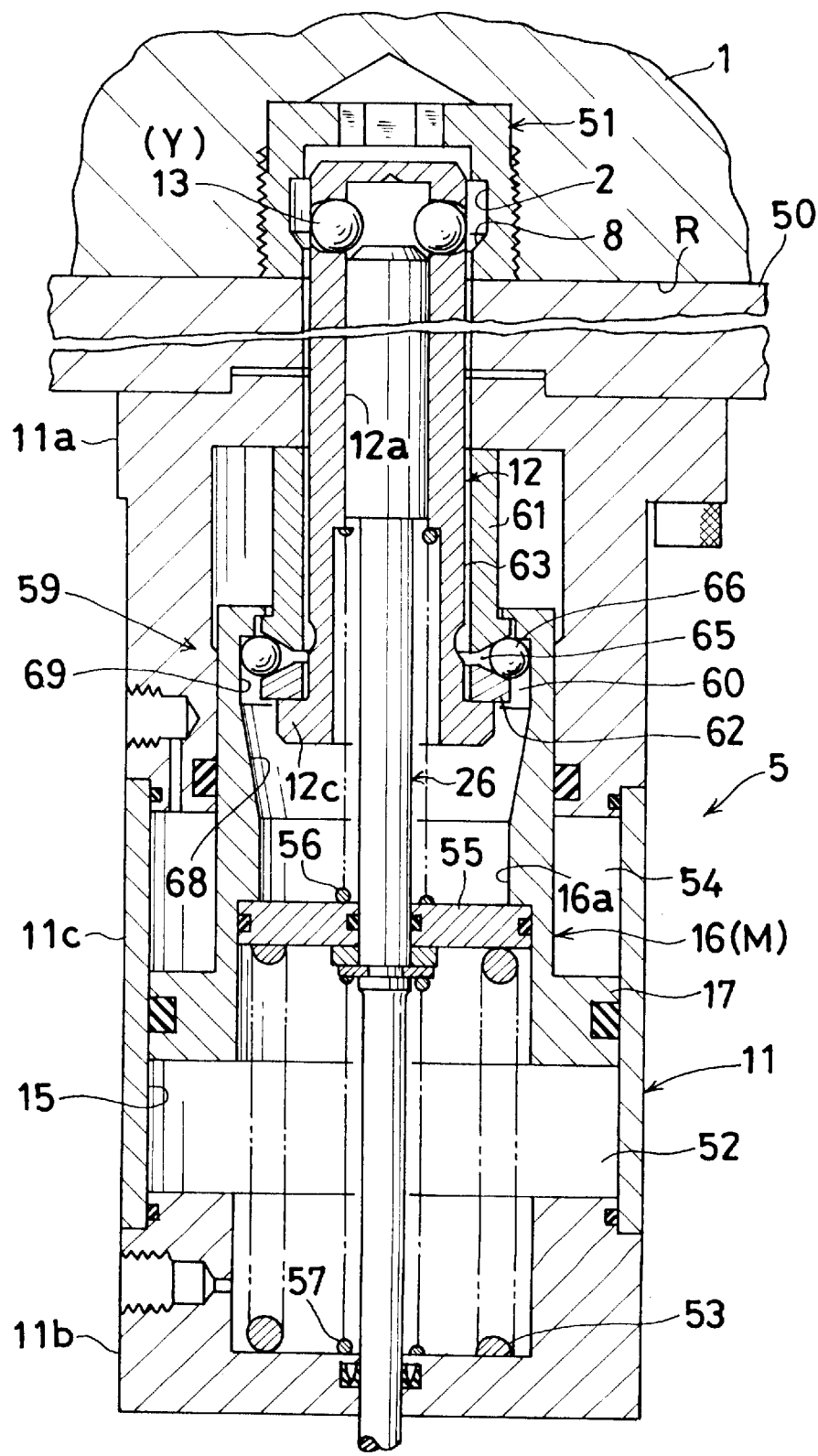

FIGS. 5 and 6 shows a second embodiment which adapts the clamping apparatus of the first embodiment so that it can be multiplicably driven. These Figures illustrate an apparatus suitable for fixing a metal mold (object to be fixed) 1 for tire molding and injection molding. FIG. 5 is a vertical sectional view of the apparatus while it is operating. FIG. 6(A) to FIG. 6(D) explain its operation.

First, a concrete structure of the apparatus is explained by resorting to FIG. 5.

A metal mold 1 to be placed on a support pedestal 50 has the surface (R) to be fixed. The surface (R) has a mouthpiece 51 of replaceable type fixed in screw-thread engagement therewith. The mouthpiece 51 is provided with the stepped hole 2.

The clamping apparatus 5 is driven by a cylinder mechanism of pneumatically double acting type. More specifically, the housing 11 comprises an upper housing 11a, a lower housing 11b and a cylinder barrel 11c. The driving member 16 has the piston 17 inserted into the cylinder barrel 11c. The piston 17 has a lower side provided with a clamping actuation chamber 52 and with a spring 53 for holding the clamping condition. And it has an upper side provided with an unclamping actuation chamber 54. Numeral 55 designates a spring retaining plate.

The pull rod 12 inserted into the cylindrical hole 16a of the driving member 16 is urged upward by a raising spring 56. The actuation member 26 inserted into the cylindrical hole 12a of the pull rod 12 is urged upward by a return spring 57. The actuation member 26 has a lower portion projecting out of the lower housing 11b. A height of the projecting portion is detected by a sensor (not shown) so as to be able to judge whether the clamping apparatus 5 is in the clamping condition or in the unclamping condition.

Interposed between the pull rod 12 inserted into the cylindrical hole 16a of the driving member 16 and the driving member 16 is a force multiplier 59 for multiplicably converting a clamp driving force of the driving member 16 to a pulling force of the pull rod 12. The multiplier 59 is constructed as follows.

An annular cam space 60 is defined between the driving member 16 and the pull rod 12. The cam space 60 has a first cam 61 and a second cam 62 vertically inserted thereinto. The first cam 61 is received by an upper wall of the upper housing 11a and the second cam 62 is received by the input portion 12c at a lower end of the pull rod 12. There is provided an annular clearance 63 for alignment between an outer peripheral surface of the pull rod 12 and the first and second cams 61, 62.

Defined between the first cam 61 and the second cam 62 is an annular wedge space 65 narrowing radially inwards. A plurality of wedging members 66 are inserted into this space 65 as peripherally spaced apart at a predetermined distance. The wedging members 66 are composed of balls here. The cylindrical hole 16a of the driving member 16 is provided with a tapered surface 68 for radially pushing the wedging members 66 inwards and with a releasing surface 69 for cancelling the pushing, the tapered surface 68 being vertically in continuity with the releasing surface 69.

The clamping apparatus 5 operates in the following manner as shown in FIG. 6.

In an unclamping condition of FIG. 6(A), compressed air is discharged from the clamping actuation chamber 52 and supplied to the unclamping actuation chamber 54. Thus the driving member 16 lowers the pull rod 12 through the both cams 61, 62 and the wedging members 66 and at the same time the spring retaining plate 55 lowers the actuation member 26 to thereby accommodate an upper end of the pull rod 12 within the support pedestal 50.

When switching over the unclamping condition of FIG. 6(A) to a clamping condition of FIG. 6(D), the compressed air is discharged from the unclamping actuation chamber 54 and is supplied to the clamping actuation chamber 52.

Then, first as shown in FIG. 6(B), the driving member 16 ascends. At the same time, the pull rod 12 and the actuation member 26 go up by the respective urging forces of the springs 56 and 57. As shown in FIG. 6(B), when the driving member 16 ascends by a stroke ($S_1$) to have the first cam 61 received by the housing 11, the pull rod 12 is inhibited from going up.

Next, as shown in FIG. 6(C), when the driving member 16 and the actuation member 26 further ascend by a stroke ($S_2$) relatively to the pull rod 12 inhibited from going up, the engaging balls 13 at the leading end of the pull rod 12 are pushed out to the projected position (X) by the actuation member 26.

Subsequently, as shown in FIG. 6(D), when the driving member 16 further ascends by a stroke ($S_3$), the tapered surface 68 is strongly and radially pushing the wedging members 66 inwards. A wedging action of the wedging members 66 strongly and vertically separates the first cam 61 from the second cam 62 to produce a separating force. The separating force strongly lowers the pull rod 12 by a stroke ($S_4$). Thus the pull rod 12 pulls and fixes the metal mold 1 to the support pedestal 50 through the plurality of balls 13. Character ($S_5$) designates an extra stroke.

When switching over the clamping condition of FIG. 6(D) to the unclamping condition of FIG. 6(A), it is sufficient if the compressed air is discharged from the clamping actuation chamber 52 and is supplied to the unclamping actuation chamber 54.

Thus, first as shown in FIG. 6(C), when the driving member 16 descends and the releasing surface 69 opposes to the wedging members 66, the wedging members 66 are allowed to move radially outwards with the result of moving the pull rod 12 upward by the raising spring 56.

Subsequently, the spring retaining plate 55 of the driving member 16 lowers the actuation member 26, thereby allowing the engaging balls 13 to move to the retreated position (Y) as shown in FIG. 6(B). Thereafter, the driving member 16 lowers the pull rod 12, thereby making it possible to secure the unclamping condition of FIG. 6(A).

The second embodiment presents the following advantages.

In the clamping condition of FIG. 6(D), even if the clamping actuation chamber 52 has its pressure reduced or lost for some reason, the spring 53 for holing the clamping condition can apply a large sliding resistance to the cams 61, 62 and the like of the force multiplier 59 with its urging force, which results in a possibility of holding the clamping condition assuredly.

Further, a fluid pressure acting on the piston 17 can be multiplicably converted by the multiplier 59 and then transmitted to the pull rod 12. This makes it possible to use a working fluid of low pressure such as the compressed air.

In the event that highly pressurized oil is utilized as the working fluid, it is possible to more strongly clamp drive by the multiplier 59.

The multiplier 59 may employ a lever mechanism instead of the illustrated wedging members 66.

It is preferable to provide the clamping apparatus of this second embodiment with the same cleaning fluid supply structure as that of the first embodiment.

Figure 7A:
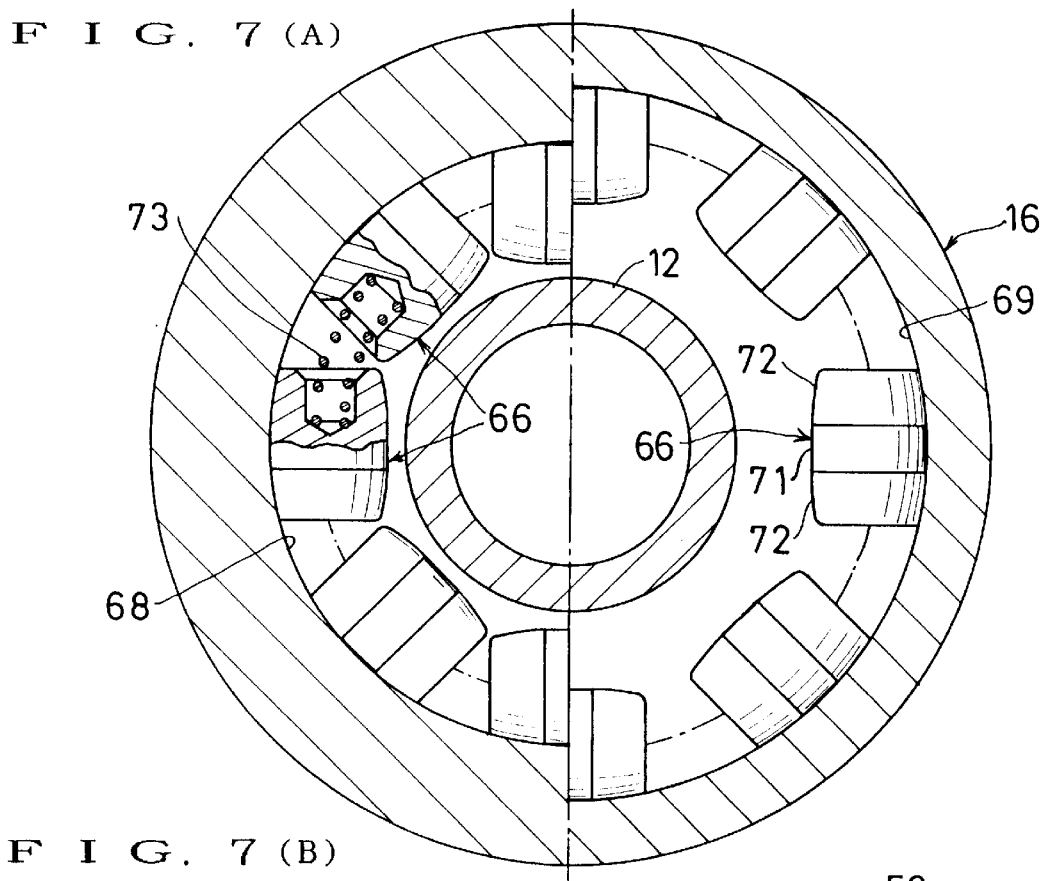
FIGS. 7(A) and 7(B) show a modification of a force multiplier used in the second embodiment.
Figure 7B:
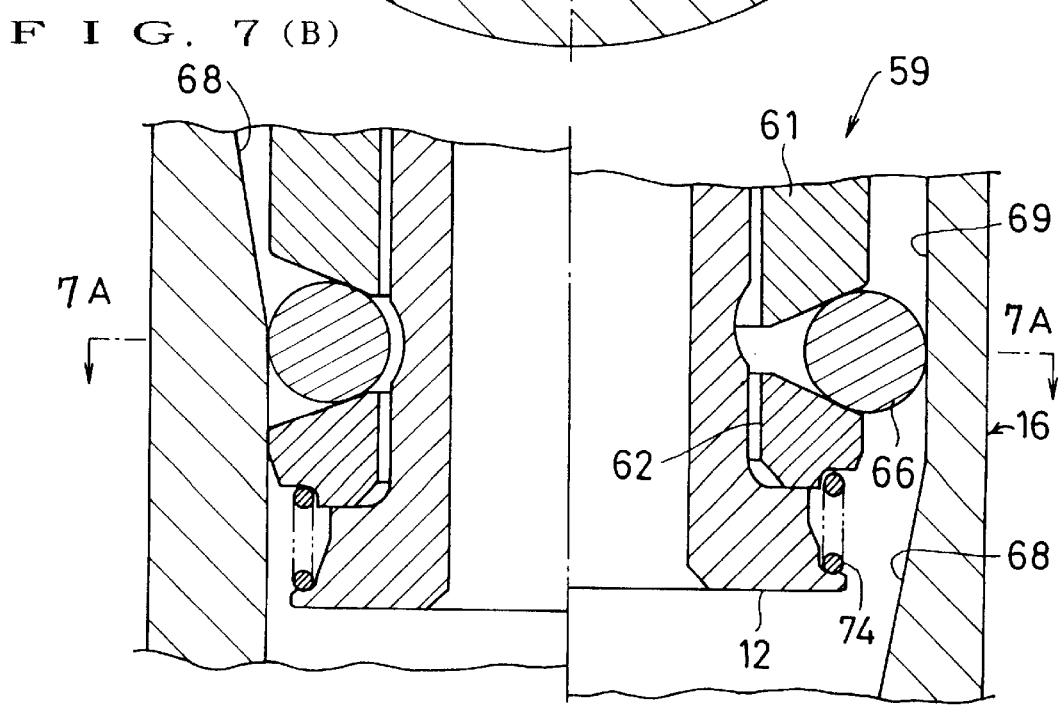

FIGS. 7(A) and 7(B) show a modification of the force multiplier 59. FIG. 7(A) is an end view when seen along a line 7A—7A in a direction indicated by arrows in FIG. 7(B). FIG. 7(B) explains how the multiplier 59 operates. Its right half view shows a wedging member 66 as released from being pushed while its left half view illustrates the wedging member 66 as pushed.

Each of the wedging members 66 comprises a circular surface portion 71 at its mid portion and spherical surface portions 72,72 at its opposite ends. Further, an aligning spring 73 is attached between adjacent wedging members 66,66 and a return spring 74 is attached between the second cam 62 and a lower portion of the pull rod 12.

The wedging members 66 of rolling type are brought into substantially even butting contact with the tapered surface 68 when compared with those of ball type. Therefore, they largely decrease in acting force per unit area when pushed with the tapered surface 68 to result in lengthening the life span of the force multiplier 59.

Each of the wedging members 66 of rolling type may comprise the spherical surface portion 72 in its entirety.

Figure 8A:
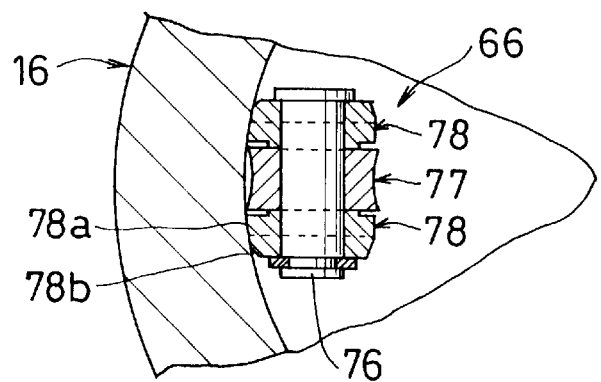
FIGS. 8(A) and 8(B) show another modification of the force multiplier.
Figure 8B:
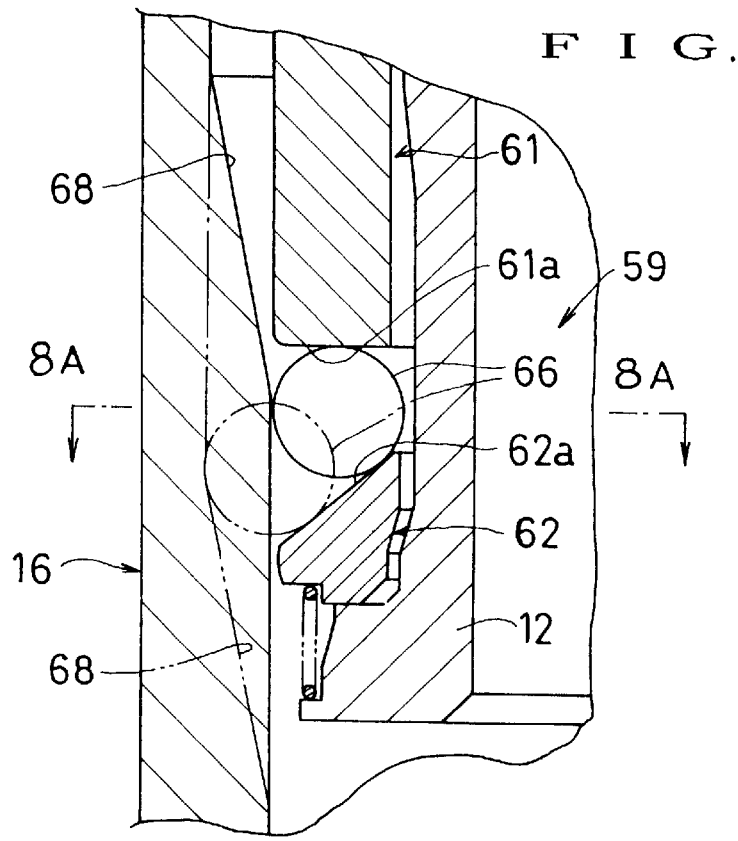

FIGS. 8(A) and 8(B) show another modification of the force multiplier 59. This modification forms the wedging member 66 into another rolling type. FIG. 8(A) is an end view when seen along a line 8A—8A in a direction indicated by arrows in FIG. 8(B). FIG. 8(B) explains its operation and corresponds to the left half view in FIG. 7(B).

The modified wedging member 66 comprises a pin 76, a central roller 77 and end rollers 78,78. The central roller 77 has an outer peripheral surface concaved in the shape of an arc at its mid portion. Thus the arc-shaped roller outer peripheral surface is brought into even butting contact with an inclined peripheral surface 62a of the second cam 62 in its entirety to roll the central roller 77 with a small acting force per unit area.

Each of the end rollers 78 comprises a circular surface portion 78a and a spherical surface portion 78b. While the circular surface portion 78a is brought into butting contact with a lower plane 61a of the first cam 61 and rolls with a small acting force per unit area, the spherical surface portion 78b is brought into even butting contact with the tapered surface 68 of the driving member 16 to be pushed with a small acting force per unit area.

The wedging member 66 of another rolling type widely reduces a frictional resistance caused at the time of clamp driving and therefore can increase a clamping force. Besides, it can prevent contact portions from seizing to result in lengthening the life span of the force multiplier 59.

Figure 8C:
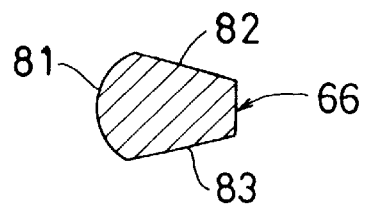
FIG. 8(C) is a sectional view showing still another modification of the wedging member.

FIG. 8(C) is a sectional view showing still another modification of the wedging member 66.

This wedging member 66 has improved that of ball type shown in FIG. 5. It comprises a spherical surface portion 81, an upper tapered surface 82 and a lower tapered surface 83, which are brought into butting contact with the tapered surface, the first cam and the second cam, respectively.

FIG. 9(A) to FIG. 9(D) show a third embodiment of the present invention, which has improved the apparatus of the first embodiment shown in FIGS. 1 to 4 as follows. Also in this third embodiment, same characters are put to the members having the same functions as those of the first embodiment.

The driving member 16 has a lower portion, into which a projecting piston 85 is hermetically inserted. The clamping apparatus 5 is adapted to sequentially operate by a difference of pressure receiving area between the piston 17 of the driving member 16 and the projecting piston 85.

More specifically, in an unclamping condition of FIG. 9(A), pressurized oil is discharged from the actuation chamber 18 to thereby raise the driving member 16 by the return spring 20 and lower the pull rod 12, the actuation member 26 and the projecting piston 85 by the urging forces of the corresponding springs.

When the pressurized oil is supplied to the actuation chamber 18, first as shown in FIG. 9(B), the projecting piston 85 goes up by a stroke ($S_{10}$) to raise the pull rod 12 and the actuation member 26. Next, as shown in FIG. 9(C), the projecting piston 85 further goes up by a stroke ($S_{11}$) to thereby raise the actuation member 26 relatively to the pull rod 12 and change over the engaging balls 13 to the projected position (X).

When the actuation chamber 18 has its oil pressure force increased higher than a set pressure, as shown in FIG. 9(D), an oil pressure force acting on the piston 17 of the driving member 16 overcomes the return spring 20 to lower the driving member 16 by a stroke ($S_{12}$). Thus the driving member 16 pulls and fixes the workpiece 1 to the housing 11 through the pull rod 12 and the engaging balls 13. Character ($S_{13}$) indicates an extra stroke.

A clamping condition of FIG. 9(D) is switched over to the unclamping condition of FIG. 9(A) through the procedures opposite to the above-mentioned ones.

Figure 10:
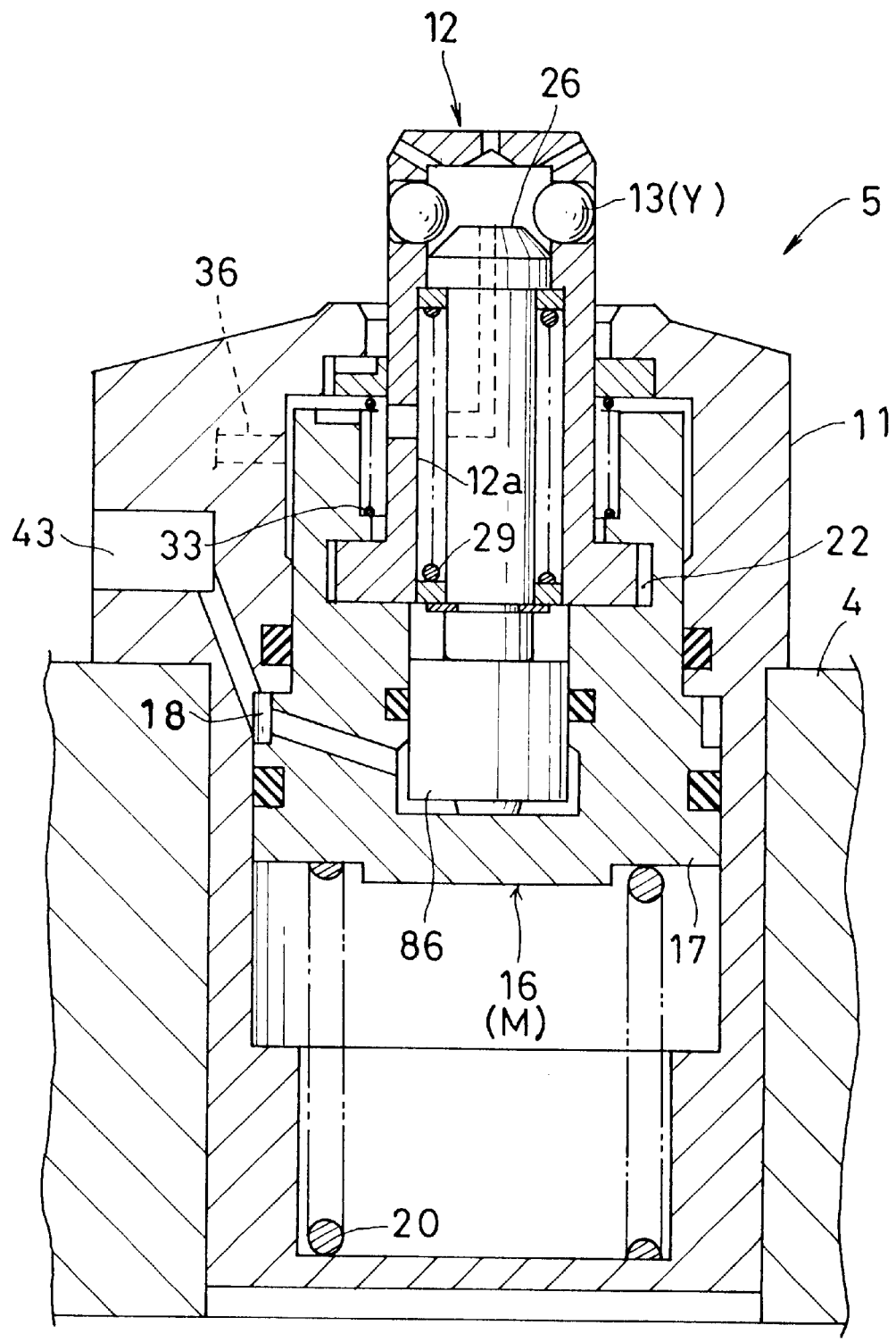
FIG. 10 shows a fourth embodiment of the present invention and corresponds to FIG. 1.

FIG. 10 shows a fourth embodiment of the present invention. When compared with the first embodiment, the fourth embodiment is different from it on the following points.

The pull rod 12 is supported so as to be vertically unmovable relatively to the driving member 16. A projecting piston 86 is adapted to raise the actuation member 26 inserted into the pull rod 12.

In an illustrated unclamping condition, pressurized oil is supplied to the supply and discharge port 43. Then, first the projecting piston 86 raises the actuation member 26 to change over the engaging balls 13 from the retreated position (Y) to the projected position. And when the actuation chamber 18 has its oil pressure force increased higher than the set pressure, the oil pressure force acting on the piston 17 of the driving member 16 overcomes the return spring 20 to lower the driving member 16.

Figure 11:
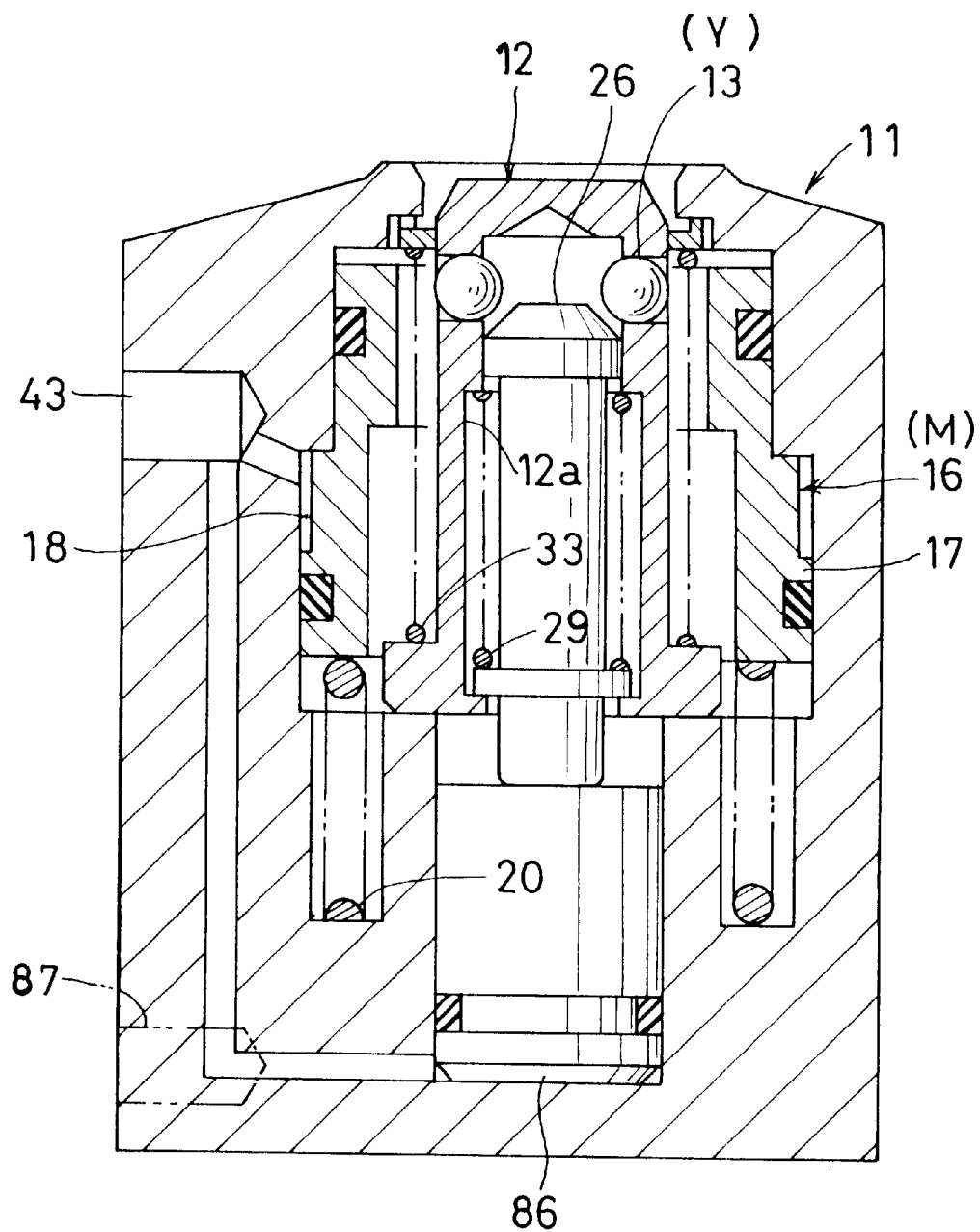
FIG. 11 shows a fifth embodiment of the present invention and corresponds to FIG. 10.

FIG. 11 shows a fifth embodiment of the present invention and corresponds to FIG. 10. In this case the projecting piston 86 is provided within the housing 11.

In an illustrated unclamping condition, pressurized oil is supplied to the supply and discharge port 43. Then, first the projecting piston 86 is raising the actuation member 26 and the pull rod 12 simultaneously. Next, the actuation member 26 ascends relatively to the pull rod 12 received by the driving member 16, thereby changing over the engaging balls 13 to the projected position. When the actuation chamber 18 has its oil pressure force increased higher than the set pressure, the oil pressure force acting on the piston 17 of the driving member 16 overcomes the return spring 20 to lower the driving member 16.

Another supply and discharge port 87 (see a view depicted by a two-dot chain line) may be provided for operating the two pistons 17 and 86 through separate circuits instead of operating them through one circuit as mentioned above.

FIG. 12 shows a sixth embodiment of the present invention and corresponds to FIG. 10.

In an illustrated unclamping condition, pressurized oil is supplied to the supply and discharge port 43 to lower the driving member 16. Then, first the pull rod 12 goes down relatively to the actuation member 26 supported by a supporting piston 88, thereby changing over the engaging balls 13 to the projected position. Next, the driving member 16 is adapted to lower the pull rod 12 and the actuation member 26.

Figure 13:
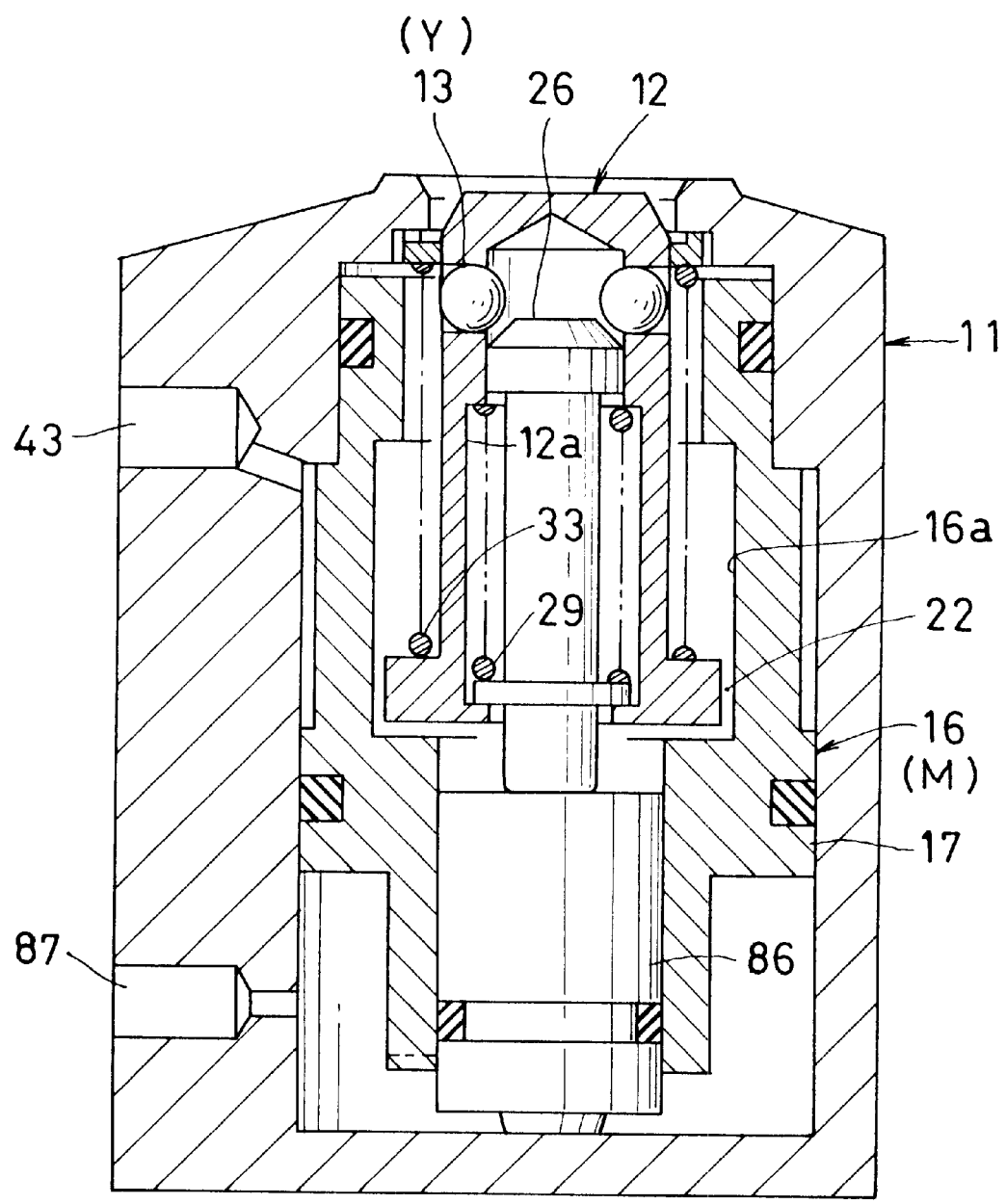
FIG. 13 shows a seventh embodiment of the present invention and corresponds to FIG. 10.

FIG. 13 shows a seventh embodiment of the present invention and corresponds to FIG. 10.

In an illustrated unclamping condition, compressed air is supplied to another supply and discharge port 87. Then, first the projecting piston 86 raises the actuation member 26 and the pull rod 12 simultaneously. Next, when the pull rod 12 is received by the driving member 16, the actuation member 26 goes up relatively to the pull rod 12, thereby changing over the engaging balls 13 to the projected position. Thereafter, pressurized oil is supplied to the supply and discharge port 43 to strongly lower the pull rod 12 by the driving member 16.

FIG. 14 explains how an eighth embodiment of the present invention operates and simplifies the apparatus of the first embodiment shown in FIGS. 1 to 4. In FIG. 14 a right half view corresponds to FIG. 1 and a left half view corresponds to FIG. 2.

In the eighth embodiment, the housing 11 receives the actuation member 26 by its lower portion. In an unclamping condition of the right half view, when pressurized oil is supplied through the supply and discharge port 43, the driving member 16 is lowering the pull rod 12. Then, first the engaging balls 13 are changed over from the retreated position (Y) to the projected position (X). Subsequently, the driving member 16 pulls and fixes the workpiece 1 to the support surface (S) through the pull rod 12 and the engaging balls 13.

Figure 15:
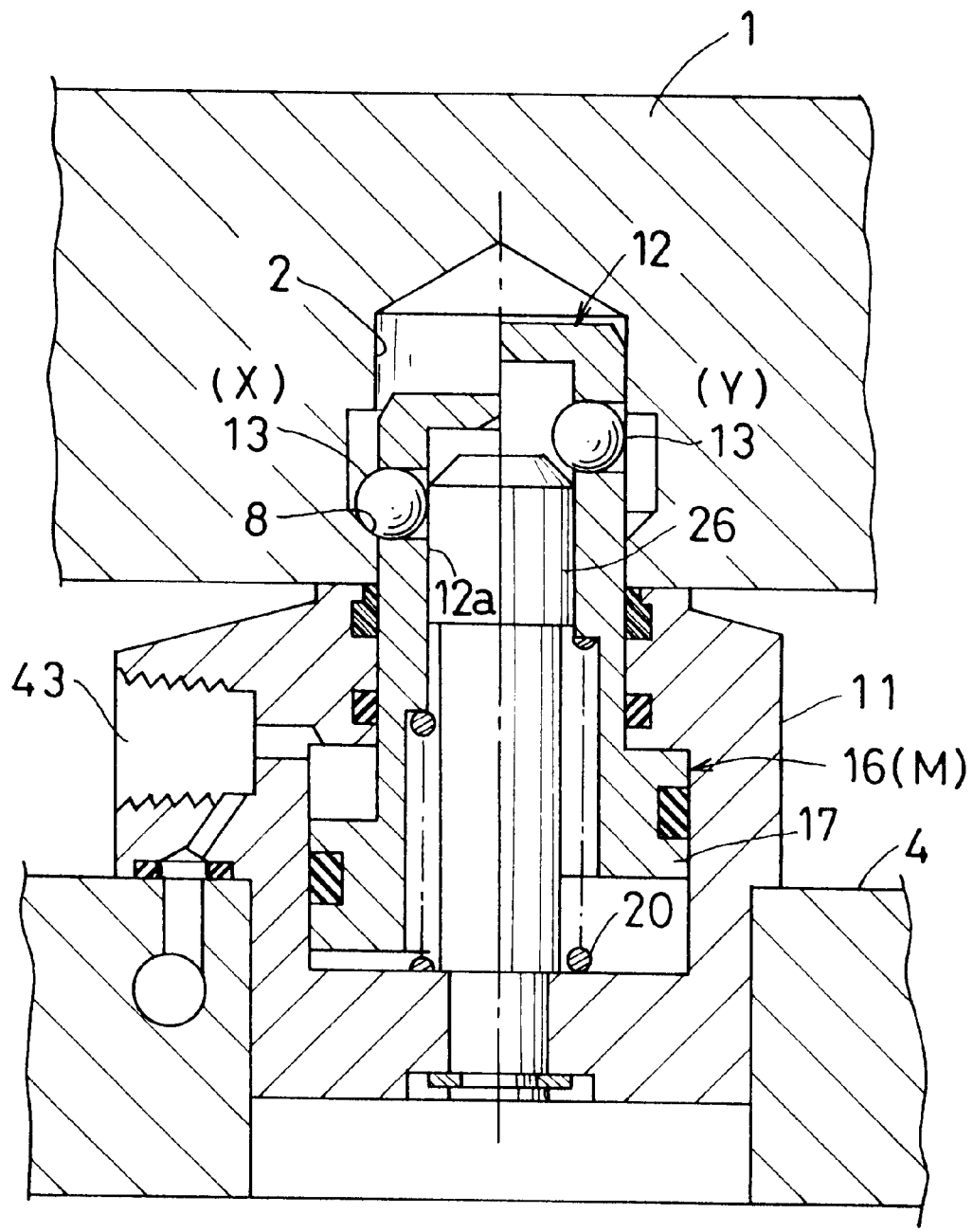
FIG. 15 explains how a ninth embodiment of the present invention operates and corresponds to FIG. 14.

FIG. 15 shows a ninth embodiment of the present invention and further simplifies the apparatus of FIG. 14. This apparatus of FIG. 15 has the pull rod 12 integrally formed with an upper portion of the driving member 16 and operates in the same manner as the apparatus of FIG. 14.

The foregoing respective embodiments can be modified as follows.

The engaging members 13 may be formed in columnar, trust-conical or the like other shapes instead of balls.

The stepped hole 2 is satisfactory if it is adapted so as to receive the engaging members 13 at the projected position (X). Therefore, it may be a through hole instead of the illustrated concaved hole.

The above-mentioned clamping mechanism (M) is sufficient if it pulls the pull rod 12. Accordingly, it is, of course, not limited to the illustrated mechanism.

The cleaning fluid may be other kinds of gas such as nitrogen gas and further liquid instead of the compressed air.

The object to be fixed may be fixed by one clamping apparatus instead of by a plurality of clamping apparatuses.

The object to be fixed may be connected to or disconnected from the clamping apparatus in a horizontal direction or an inclined direction instead of the illustrated vertical direction.

What is claimed is:

1. A clamping apparatus including a housing (11) and adapted to pull an object (1) to be fixed, which has a stepped hole (2), toward the housing (11), the clamping apparatus comprising:

a pull rod (12) having an axis extending longitudinally and a first end portion and a second end portion and provided with a cylindrical hole (12a) extending in the axial direction, the pull rod (12) being inserted into the housing (11) movably in the axial direction and adapted to have the first end portion fitted into the stepped hole (2);

a plurality of engaging members (13) arranged at the first end portion of the pull rod (12) as peripherally spaced apart at a predetermined distance, the engaging members (13) being supported by the first end portion of the pull rod (12) so as to be movable between a projected position (X) far away from the axis and a retreated position (Y) close to the axis;

an actuation member (26) inserted into the cylindrical hole (12a) of the pull rod (12), the actuation member (26) and the pull rod (12) being moved relatively to each other in the axial direction to thereby change over the engaging members (13) from the retreated position (Y) to the projected position (X); and a clamping mechanism (M) moving the pull rod (12) toward the second end portion at the time of clamp driving.

2. A clamping apparatus as set forth in claim 1, wherein the housing (11) has a guide bore (15) extending in the axial direction, and the clamping mechanism (M) comprises an annular driving member (16) having a cylindrical hole (16a), the driving member (16) being inserted into the guide bore (15) movably in the axial direction, the pull rod (12) being inserted into the cylindrical hole (16a) of the driving member (16), an annular gap (22) being defined between the cylindrical hole (16a) of the driving member (16) and the pull rod (12).

3. A clamping apparatus as set forth in claim 2, the clamping apparatus including a support surface (S) which receives the object (1) to be fixed, wherein the housing (11) has the actuation member (26) inserted thereinto movably in the axial direction, the support surface (S) being provided with a working allowance ($\alpha$) when the pull rod (12) has been moved toward the second end portion, the pull rod (12) being adapted to have the first end portion positioned inwards of the support surface (S) with the working allowance ($\alpha$) removed.

4. A clamping apparatus as set forth in claim 1, wherein the housing (11) is provided with a cleaning fluid supply port (36) and the pull rod (12) is provided at the first end portion with a blowout hole (37), the supply port (36) being communicated with the blowout hole (37) through a communication passage (38), the passage (38) being provided in at least one of the cylindrical hole (12a) of the pull rod (12) and the actuation member (26).

5. A clamping apparatus as set forth in claim 1, wherein the pull rod (12) has an outer peripheral surface and the housing (11) has a first end portion, another blowout hole (40) being provided between the outer peripheral surface of the pull rod (12) and the first end portion of the housing (11), a cleaning fluid supply port (36) being communicated with the another blowout hole (40).

6. A clamping apparatus as set forth in claim 1, wherein the housing (11) has a guide bore (15) extending in the axial direction, and the clamping mechanism (M) comprises an annular driving member (16) having a cylindrical hole (16a), the driving member (16) being inserted into the guide bore (15) movably in the axial direction, the pull rod (12) being inserted into the cylindrical hole (16a) of the driving member (16), a force multiplier (59) being interposed between the pull rod (12) and the driving member (16) so as to multiplicably convert a clamp driving force of the driving member (16) to a pulling force of the pull rod (12).

7. A clamping apparatus as set forth in claim 6, wherein the force multiplier (59) comprises a cam space (60) defined between the driving member (16) and the pull rod (12), the pull rod (12) having an input portion (12c), and the cam space (60) has a first cam (61) and a second cam (62) inserted thereinto as arranged side by side in the axial direction, the first cam (61) and the second cam (62) being received by the housing (11) and the input portion (12c) of the pull rod (12), respectively, an annular wedge space (65) being defined between the first cam (61) and the second cam (62), the space (65) narrowing toward the axis and having a plurality of wedging members (66) inserted thereinto as peripherally spaced apart at a predetermined distance, the driving member (16) being provided with a tapered surface (68) pushing the wedging members (66) toward the axis and with a releasing surface (69) cancelling the pushing.

8. A clamping apparatus as set forth in claim 7, wherein the pull rod (12) has an outer peripheral surface, an annular clearance (63) being defined between the outer peripheral surface and the first and second cams (61),(62).

9. A clamping apparatus as set forth in claim 2, wherein the housing (11) is provided with a cleaning fluid supply port (36) and the pull rod (12) is provided at the first end portion with a blowout hole (37), the supply port (36) being communicated with the blowout hole (37) through a communication passage (38), the passage (38) being provided in at least one of the cylindrical hole (12a) of the pull rod (12) and the actuation member (26).

10. A clamping apparatus as set forth in claim 2, wherein the pull rod (12) has an outer peripheral surface and the housing (11) has a first end portion, another blowout hole (40) being provided between the outer peripheral surface of the pull rod (12) and the first end portion of the housing (11), a cleaning fluid supply port (36) being communicated with the another blowout hole (40).

11. A clamping apparatus as set forth in claim 3, wherein the housing (11) is provided with a cleaning fluid supply port (36) and the pull rod (12) is provided at the first end portion with a blowout hole (37), the supply port (36) being communicated with the blowout hole (37) through a communication passage (38), the passage (38) being provided in at least one of the cylindrical hole (12a) of the pull rod (12) and the actuation member (26).

12. A clamping apparatus as set forth in claim 3, wherein the pull rod (12) has an outer peripheral surface and the housing (11) has a first end portion, another blowout hole (40) being provided between the outer peripheral surface of the pull rod (12) and the first end portion of the housing (11), a cleaning fluid supply port (36) being communicated with the another blowout hole (40).

* * * * *